(12) United States Patent
Morita et al.

(10) Patent No.: US 6,730,398 B2
(45) Date of Patent: May 4, 2004

(54) FINE CARBON AND METHOD FOR PRODUCING THE SAME

(75) Inventors: Toshio Morita, Kanagawa (JP); Ryuji Yamamoto, Kanagawa (JP); Tomoyoshi Higashi, Kanagawa (JP); Katsuyuki Tsuji, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/231,290

(22) Filed: Aug. 30, 2002

(65) Prior Publication Data

US 2003/0044603 A1 Mar. 6, 2003

Related U.S. Application Data

(60) Provisional application No. 60/316,985, filed on Sep. 5, 2001.

(30) Foreign Application Priority Data

Aug. 31, 2001 (JP) ..................................... P2001-264052

(51) Int. Cl.$^7$ .................................................. D01F 6/00
(52) U.S. Cl. .................... 428/367; 428/408; 423/447.1
(58) Field of Search ................................ 428/367, 408; 423/747.1

(56) References Cited

U.S. PATENT DOCUMENTS

| 4,663,230 A | 5/1987 | Tennent |
| 6,565,971 B2 * | 5/2003 | Morita et al. ............. 428/367 |

FOREIGN PATENT DOCUMENTS

| JP | 60-27700 A | 2/1985 |
| JP | 60-054998 A | 3/1985 |
| JP | 61-070014 A | 4/1986 |
| JP | 07-150419 A | 6/1995 |
| JP | 2778434 B | 5/1998 |

OTHER PUBLICATIONS

Rodriguez et al., "Catalytic Engineering of Carbon Nano-structures", *Langmuir*, vol. 11, pp. 3862–2366, 1995.

* cited by examiner

*Primary Examiner*—N. Edwards
(74) *Attorney, Agent, or Firm*—Sughrue Mion, PLLC

(57) ABSTRACT

A vapor grown fine carbon fiber including a hollow space along the fiber in its interior, and having a multi-layer structure, an outer diameter of 2 to 500 nm, and an aspect ratio of 10 to 15,000 is disclosed. The fiber has a center portion and a peripheral portion, and the center portion having a carbon structure different from that of the peripheral portion. A method for producing the fine carbon fiber, and a battery and gas occlusion material containing the fine carbon fiber are also disclosed.

14 Claims, 4 Drawing Sheets x2M x200k x2M

FINE CARBON AND METHOD FOR PRODUCING THE SAME

CROSS REFERENCE TO RELATED APPLICATIONS

This application is an application filed under 35 U.S.C. §111(a) claiming benefit pursuant to 35 U.S.C. §119(e)(1) of the filing date of Provisional Application No. 60/316,985 filed Sep. 5, 2001 pursuant to 35 U.S.C. §111(b).

FIELD OF THE INVENTION

The present invention relates to a fine carbon fiber which is used as a filler material incorporated into various materials such as metal, resin, and ceramic, to thereby improve electrical conductivity and thermal conductivity, which is used as an electron emission material for producing a field emission display (FED), which is used as a medium for occluding hydrogen, methane, or various other gasses, and which is used as a filler material employed in, for example, materials for improving properties of batteries; and to a method for producing the fine carbon fiber.

The present invention also relates to a battery electrode containing the fine carbon fiber so as to attain improved charge/discharge capacity and exhibit improved strength, the battery electrode being employed as a positive or negative electrode of any of a variety of secondary batteries such as dry batteries, Pb storage batteries, capacitors, and recently developed Li-ion secondary batteries.

BACKGROUND OF THE INVENTION

In the late 1980's, studies were conducted on vapor grown carbon fiber (hereinafter abbreviated as "VGCF"). VGCF having a diameter of 1,000 nm or less and a length of some tens of $\mu$m or less is known to be produced through thermal decomposition of a gas of, for example, hydrocarbon in a vapor phase in the presence of a metallic catalyst.

A variety of processes for producing VGCF are disclosed, including a process in which an organic compound such as benzene, serving as a raw material, and an organo-transition metallic compound such as ferrocene, serving as a catalyst, are introduced into a high-temperature reaction furnace together with a carrier gas, to thereby produce VGCF on a substrate (Japanese Patent Application Laid-Open (kokai) No. 60-27700); a process in which VGCF is produced in a dispersed state (Japanese Patent Application Laid-Open (kokai) No. 60-54998); and a process in which VGCF is grown on a reaction furnace wall (Japanese Patent No. 2778434).

Through the aforementioned processes, there can be produced carbon fiber of relatively small diameter and high aspect ratio which exhibits excellent electrical conductivity and thermal conductivity, and is suitable as a filler material. Therefore, carbon fiber having a diameter of about 10 to about 200 nm and an aspect ratio of about 10 to about 500 is mass-produced, and is used, for example, as an electrically or thermally conductive filler material in electrically conductive resin or as an additive in lead storage batteries.

A characteristic feature of a VGCF fiber resides in its shape and crystal structure. A VGCF fiber has a structure including a very thin hollow space extending along the fiber in its center portion, and a plurality of carbon hexagonal network layers grown around the hollow space so as to form concentric rings.

Iijima, et al., 1991, Nature, 354, 56, have discovered a carbon nano-tube, which is a type of carbon fiber having a diameter smaller than that of VGCF, in soot produced by evaporating a carbon electrode through arc discharge in helium gas. The carbon nano-tube has a diameter of 1 to 30 nm, and is a fine carbon fiber having a structure similar to that of a VGCF fiber; i.e., the tube has a structure including in its center portion a hollow space extending along the fiber, and a plurality of carbon hexagonal network layers grown around the hollow space so as to form concentric rings.

However, the above process for producing the nano-tube through arc discharge has not yet been put into practice, since the process is not suitable for mass production.

Meanwhile, the vapor-growth process may feasibly produce carbon fiber having a high aspect ratio and exhibiting high electrical conductivity, and therefore attempts have been made to improve the vapor-growth process for the production of carbon fiber of smaller diameter. For example, U.S. Pat. No. 4,663,230 discloses a graphitic cylindrical carbon fibril having a diameter of about 3.5 to 70 nm and an aspect ratio of 100 or more. The carbon fibril has a structure in which a plurality of layers of regularly arranged carbon atoms are continuously disposed concentrically about the cylindrical axis of the fibril, and the C-axis of each of the layers is substantially perpendicular to the cylindrical axis. The entirety of the fibril includes no thermal carbon overcoat deposited through thermal decomposition, and has a smooth surface.

In order to attain improvement of VGCF, Japanese Patent Application Laid-Open (kokai) No. 61-70014 discloses a carbon fiber having a diameter of 10 to 500 nm and an aspect ratio of 2 to 30,000, which fiber is produced through a vapor-growth process. According to this publication, a carbon layer obtained through thermal decomposition has a thickness of 20% or less the diameter of the carbon fiber.

When being employed as an electrically conductive filler or a thermally conductive filler, the aforementioned VGCF, carbon nano-tube, or carbon fibril exerts excellent effect by virtue of its structure and shape.

Unlike the case of typical carbon black, VGCF, carbon nano-tube or carbon fibril have a carbon structure of high electrical conductivity and thermal conductivity which has been developed along the axis of a fiber. Therefore, VGCF, carbon nano-tube or carbon fibril have fewer points of contact between particles or between fibers per unit length as compared with the case of carbon black, and thus exhibit low contact resistance. Therefore, VGCF, carbon nano-tube or carbon fibril exert excellent effect in terms of electrical conductivity or similar properties. Furthermore, VGCF, carbon nano-tube or carbon fibril exhibit high strength by virtue of their fibrous shape.

Attempts have been made to provide fine carbon fibers of different structures, and there is disclosed a fine carbon fiber having a herringbone-shaped carbon structure, as well as a fine carbon fiber having a structure including no hollow space in which carbon layers are formed parallel with the axis of the fiber (N. M. Rodriguez et. al., Langmuir., vol 11, pages 3862–3866, 1995).

These attempts have been made in an effort to improve functions of fine carbon fiber, such as occlusion of a gas (e.g., hydrogen).

SUMMARY OF THE INVENTION

In view of the foregoing, an object of the present invention is to provide a fine carbon fiber which exhibits improved occlusion of a gas such as hydrogen, and which is used as a filler which, when incorporated into a battery electrode, can improve electrical conductivity, thermal conductivity, and strength.

The present inventors have performed studies in an attempt to obtain a filler which exhibits occlusion of a gas such as hydrogen, and which attains improved electrical conductivity, thermal conductivity, and strength, to thereby improve the structure of VGCF; and as a result have produced a novel fine carbon fiber having an outer diameter of 0.002 to 0.5 µm, an aspect ratio of 10 to 15,000, and a carbon structure differing from that of a conventional fine carbon fiber.

Accordingly, the present invention provides the following embodiments:

1) A vapor grown fine carbon fiber comprising a hollow space along the fiber in its interior, and having a multi-layer structure, an outer diameter of 2 to 500 nm, and an aspect ratio of 10 to 15,000, wherein the fiber comprises a center portion and a peripheral portion, the center portion having a carbon structure different from that of the peripheral portion;

2) The fine carbon fiber according to 1) above, wherein the hollow space of the fiber has a diameter (d0) and the fiber has an outer diameter (d) satisfying the following relation: $0.1d \leq d0 \leq 0.8d$;

3) The fine carbon fiber according to 1) or 2) above, wherein the center portion of the fiber has a diameter (d1), the hollow space of the fiber has a diameter (d0), and the fiber has an outer diameter (d) satisfying the following relations: $1.1d0 \leq d1$ and $d1 \leq 0.9d$;

4) The fine carbon fiber according to any one of 1) through 3) above, wherein the center portion of the fiber contains a herringbone-shaped carbon structure, and the the peripheral portion of the fiber contains a concentric ring carbon structure;

5) The fine carbon fiber according to any one of 1) through 4) above, wherein the hollow space is partially closed;

6) A fine carbon fiber obtained through heat treatment of a fine carbon fiber as recited in any one of 1) through 5) above at about 2,000 to about 3,500° C.;

7) The fine carbon fiber according to any one of 1) through 6) above, further comprising boron or a boron compound;

8) The fine carbon fiber according to 7) above, wherein boron (B) is present in an amount of about 0.01 to about 5 mass %, in carbon crystals constituting the carbon fiber;

9) A fine carbon fiber mixture comprising a fine carbon fiber as recited in any one of 1) through 8) above in an amount of about 5 to about 80 vol. % on the basis of the entire carbon fiber mixture;

10) A method for producing a fine carbon fiber comprising thermally decomposing a carbon material in the presence of a catalyst fluid containing a solvent and fine particles of a catalyst dispersed therein, wherein the fine particles have a size of 20 nm or less, and the catalyst comprises a transition metallic compound comprising at least one element selected from the group consisting of Fe, Ni, and Co;

11) A fine carbon fiber composition comprising a fine carbon fiber as recited in any one of 1) through 8) above;

12) A gas occlusion material comprising a fine carbon fiber composition as recited in 11) above; and 13) A secondary battery comprising an electrode material, wherein the electrode material is a fine carbon fiber composition as recited in 11) above.

DESCRIPTION OF THE PREFERRED EMBODIMENTS

The present invention will next be described in detail.

The present inventors have performed studies in an attempt to obtain a filler which exhibits occlusion of a gas such as hydrogen, and which attains improved electrical conductivity, thermal conductivity, and strength; have performed studies on a variety of catalysts in order to improve the carbon structure of VGCF; and have developed a novel fine carbon fiber having an outer diameter of 2 to 500 nm, an aspect ratio of 10 to 15,000, and a carbon structure differing from that of a conventional fine carbon fiber.

Figure 1:
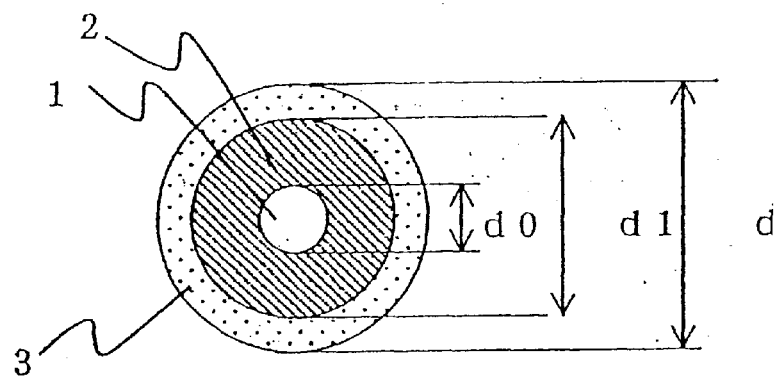
FIG. 1 is a schematic representation (cross-sectional view) showing a fine carbon fiber of the present invention.
Figure 2A:
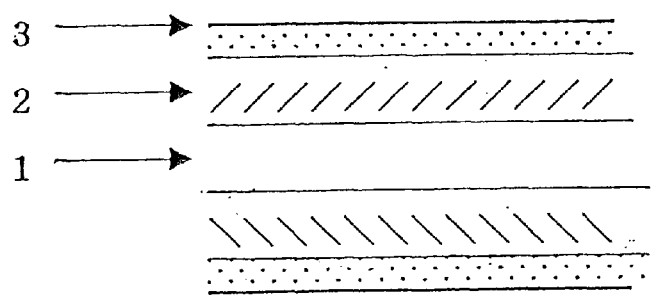
FIG. 2A is a schematic representation of the fine carbon fiber of the present invention (cross-sectional view of the fiber in a direction along the axis of the fiber) (center portion: herringbone-shaped carbon structure).
Figure 2B:
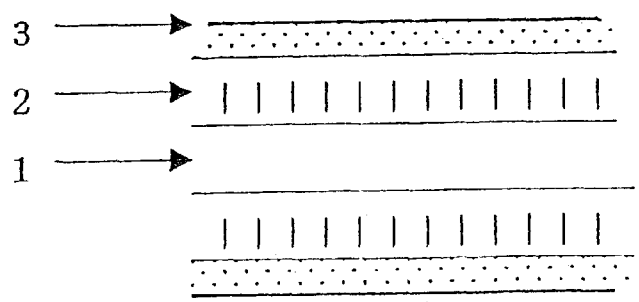
FIG. 2B is a schematic representation of the fine carbon fiber of the present invention (cross-sectional view of the fiber in a direction along the axis of the fiber) (center portion: carbon sheets are aligned perpendicular to the axis of the fiber).

Characteristic features of the fine carbon fiber of the present invention will be described with reference to the attached drawings (FIG. 1, FIG. 2A, and FIG. 2B). In FIGS. 2A and 2B, short solid lines schematically represent carbon sheets (i.e., layers of graphite or layers of crystals of graphite-like carbon).

The vapor grown fine carbon fiber has an outer diameter of 2 to 500 nm and an aspect ratio of 10 to 15,000 and contains a center portion 2 and a peripheral portion 3, the center portion having a carbon structure different from that of the peripheral portion, the fiber contains a hollow space 1 along the interior, and has a multi-layer structure including two or more carbon layers, as shown in FIG. 1 (i.e., a schematic cross-sectional view in a direction perpendicular to the axis of the fiber) and in FIGS. 2(A) and (B) (i.e., a schematic cross-sectional view in a direction along the axis of the fiber). For example, the multi-layer structure is formed of two carbon layers; i.e., a layer constituting the center portion and a layer constituting the peripheral portion, the center portion having a carbon structure different from that of the peripheral portion. An additional carbon layer may be provided between the center layer and the peripheral layer.

(1) Although the hollow space of the fine carbon fiber of the present invention has the same structure as that of a hollow space of a conventional VGCF fiber, the diameter (d0) of the hollow space of the fiber of the present invention is larger than that of the hollow space of the conventional VGCF fiber, and d0 is 10 to 80% the outer diameter (d) of the fiber; i.e., d0 and d satisfy the following relation: $0.1d \leq d0 \leq 0.8d$. As described below, a hollow space larger than that of conventional VGCF is considered to be required for formation of the aforementioned center portion.

Figure 4:
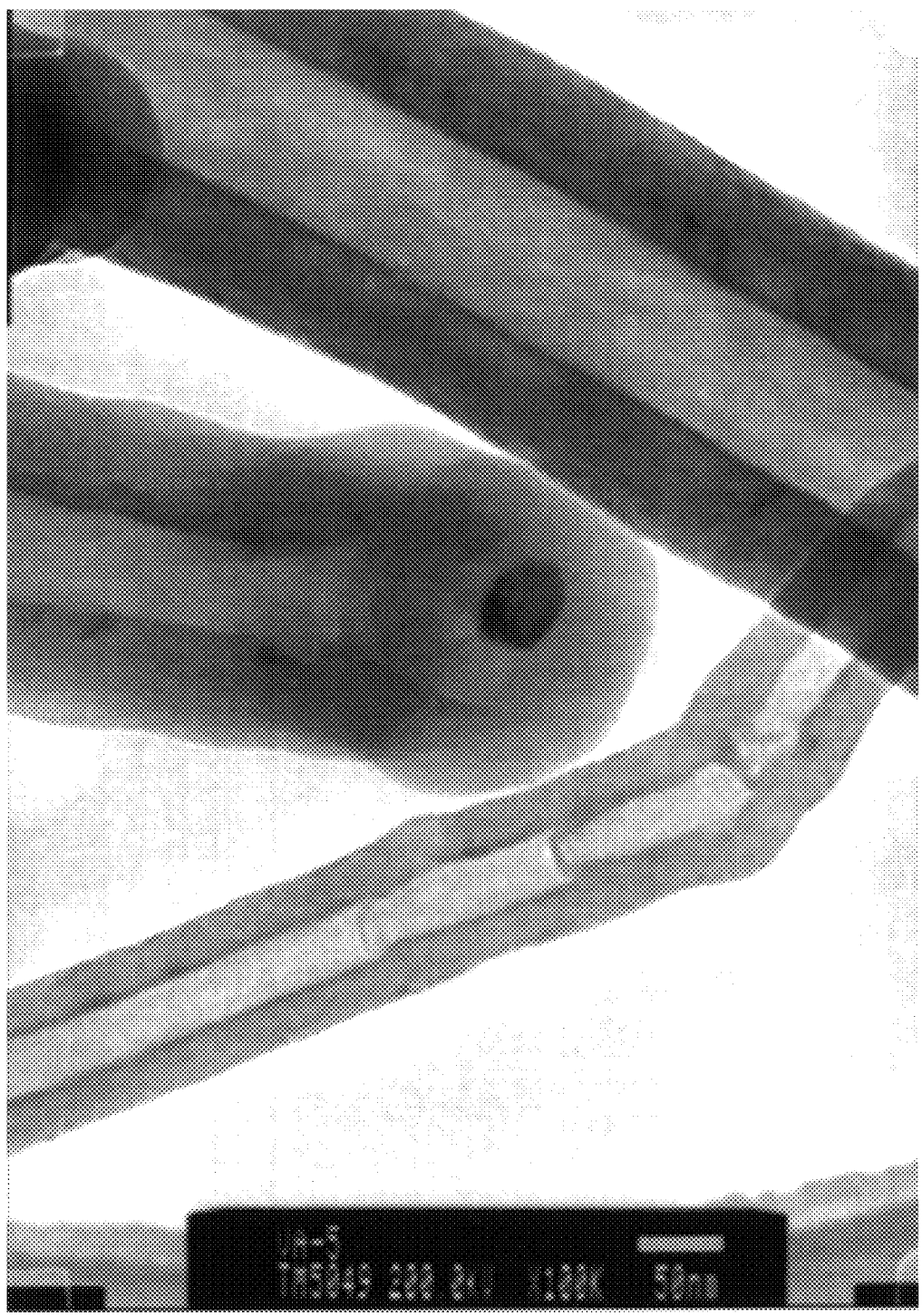
FIG. 4 shows a transmission electron micrograph of the fine carbon fiber of the present invention (magnification: $2\times10^5$) (the center portion contains a herringbone-shaped carbon structure, and the hollow space is partially closed).

The hollow space of the fine carbon fiber may be partially closed by carbon layers or may extend throughout the fiber; i.e., the hollow space may be present continuously or non-continuously. For example, FIG. 4 shows a transmission electron micrograph of a fine carbon fiber having a partially closed hollow space. FIG. 4 shows a carbon fiber where the center portion of the hollow space of the carbon fiber is closed at three points.

(2) The center portion has a herringbone-shaped carbon structure as shown in FIG. 2A or a carbon structure as shown in FIG. 2B in which carbon sheets are aligned substantially perpendicular to the axis of the fiber. As used herein, the expression "herringbone-shaped carbon structure" refers to a structure as shown in FIG. 2A, in which carbon sheets are not aligned parallel to the axis of the fiber, and each of the carbon sheets is inclined with respect to the axis at an angle of not 90° or thereabouts. At least a portion of the center portion is preferably formed of a herringbone-shaped carbon structure and/or a perpendicular carbon structure. For example, when the center portion of a fine carbon fiber is observed under a transmission electron microscope, the area of a herringbone-shaped carbon structure and/or a perpendicular carbon structure is at least 20%, preferably at least 40%, more preferably at least 50%, on the basis of the entire area of the center portion.

(3) The diameter (d1) of the center portion of the fine carbon fiber falls within the following ranges: $1.1d0 \leq d1$ and $d1 \leq 0.9d$. When the diameter of the center portion falls below the above range, the fiber exhibits poor gas occlusion, whereas when the diameter exceeds the above range, the strength of the fiber is lowered.

(4) The peripheral portion of the fine carbon fiber may have any carbon structure, so long as the structure differs from that of the center portion. In consideration of strength of the fine carbon fiber, the peripheral portion preferably has a concentric ring structure. The peripheral portion may have the following structure: a structure in which carbon layers form concentric rings; or a structure in which concentric-ring-forming carbon layers form an incomplete sheath of graphene (carbon hexagonal network plane), the carbon layers are partially broken, and two adjacent carbon layers are formed into a single carbon layer. The cross section in a direction perpendicular to the axis of the carbon fiber does not necessarily assume a round shape, and may assume an elliptical shape or a polygonal shape.

A thermally decomposed carbon layer may be present on the surface of the peripheral portion.

(5) The fine carbon fiber of the present invention is typically produced through a vapor-phase thermal decomposition method. As-produced crude fine carbon fiber may be subjected to heat treatment at 800 to 1,500° C. and/or at 2,000 to 3,500° C.

(6) The heat-treated fine carbon fiber may further be subjected to heat treatment at 2,000 to 3,500° C. in the presence of a boron compound; i.e., the carbon fiber may be subjected to heat treatment while being mixed with a boron compound or while being in contact with a gas of a boron compound. As a result, the fine carbon fiber may contain boron or a boron compound.

The carbon structure of the fine carbon fiber of the present invention has been described above. The fine carbon fiber has a hollow structure and contains a center portion and a peripheral portion, the center portion having a carbon structure different from that of the peripheral portion.

In the fine carbon fiber of the present invention, the center portion has a carbon structure suitable for improving occlusion of various gasses, and the peripheral portion has a carbon structure different from that of the center portion. Therefore, the strength of the fine carbon fiber is increased as compared with the case of a fine carbon fiber which is formed merely of a carbon structure which is the same as its center portion. The aforementioned structure of the fine carbon fiber of the present invention is not known in carbon fibers produced through a variety of conventional vapor-phase processes; i.e., the fine carbon fiber is novel.

The fine carbon fiber of the present invention may be incorporated into fine carbon fiber of conventional structure. When the fine carbon fiber of the present invention is incorporated in an amount of 5 to 80 vol. %, preferably 10 to 70 vol. %, more preferably 15 to 50 vol. %, on the basis of the entire carbon fiber, the resultant carbon fiber exhibits improved occlusion of gasses.

The fine carbon fiber of the present invention has an outer diameter of 2 to 500 nm and an aspect ratio of 10 to 15,000. The fine carbon fiber can be used as a filler material, and exerts excellent reinforcement effect.

The method for producing the fine carbon fiber of the present invention will be described. The fine carbon fiber of the present invention is produced through thermal decomposition of a carbon material, particularly a hydrocarbon, in the presence of a catalyst containing a transition metallic compound.

The transition metal constituting the transition metallic compound is preferably a metal belonging to Group IVa, Va, VIa, VIIa, or VIII of the periodic table. Particularly, Fe, Ni, and Co are preferred. In order to disperse a transition metal in an organic compound, preferably in an organic solvent, ultra fine particles (preferably particles having a size of 20 nm or less) of a transition metallic compound, such as a transition metal oxide, a transition metal nitride, a transition metal halide, or a transition metallic salt, are prepared, and the particles are dispersed in an organic solvent by use of a dispersant or a surfactant (preferably a cationic surfactant or an anionic surfactant). The dispersion amount of a transition metallic compound serving as a catalyst is 0.003 to 5 mass %, preferably 0.01 to 3 mass %, more preferably 0.03 to 1.5 mass %, as reduced to transition metal.

In the present invention, a sulfur compound may be employed as a promoter. No particular limitation is imposed on the type of sulfur compound, so long as the sulfur compound can be dissolved in a carbon material serving as a carbon source. The amount of a sulfur compound to be employed is 0.01 to 10 mass %, preferably 0.03 to 5 mass %, more preferably 0.1 to 4 mass %, on the basis of the entirety of a carbon source.

Examples of the carbon material which serve as a raw material of the fine carbon fiber include organic compounds such as butadiene, ethylene, acetylene, benzene, toluene, xylene, methanol, ethanol, naphthalene, cyclopentane, and cyclohexane; gasoline; and kerosene. Of these, aromatic compounds such as benzene, toluene, and xylene are particularly preferred.

A typical reducing gas such as hydrogen gas is employed as a carrier gas. The amount of a carrier gas to be employed is appropriately 1 to 70 parts by mol on the basis of 1 part by mol of a carbon material serving as a carbon source. The outer diameter of a fine carbon fiber to be produced can be regulated by varying the ratio between the carbon source and the carrier gas, and by varying the residence time of the carbon source and the carrier gas in a reaction furnace.

A carbon material serving as a carbon source and a catalyst fluid in which a transition-metallic-compoundcontaining catalyst dispersed in an organic solvent may be fed to a reaction furnace separately. Alternatively, a transition metallic compound may be dispersed in a carbon material serving as a carbon source, and the resultant mixture is sprayed in the form of liquid into a reaction furnace by use of a carrier gas. A promoter may be incorporated in a carbon material or in a catalyst fluid. The incorporation method of a promoter may be determined in accordance with, for example, the structure and yield of the fine carbon fiber to be produced.

A vertical electric furnace is typically employed as a reaction furnace. The reaction temperature is 800 to 1,300° C., preferably 1,000 to 1,300° C. A raw material fluid and a carrier gas are fed to a reaction furnace heated to a predetermined temperature so as to allow reaction to proceed, thereby producing a fine carbon fiber.

The raw material; i.e., a carbon material (an organic compound), which has been fed to the reaction furnace as described above, serves as a carbon source; the transition metallic compound is formed into transition metal particles serving as a catalyst (catalyst fine particles having a size of 20 nm or less may be associated with one another to thereby form catalyst particles having a size of at least 20 nm; the particle size is preferably 200 nm or less, more preferably 100 nm or less); and fine carbon fiber is grown around the transition metal particles serving as nuclei.

The resultant fine carbon fiber is subjected to heat treatment at 800 to 1,500° C. in an atmosphere of an inert gas such as helium or argon, and then further subjected to heat treatment at 2,000 to 3,500° C. Alternatively, the crude fine carbon fiber as produced through reaction is subjected to heat treatment at 2,000 to 3,500° C. in an inert gas atmosphere.

The crude fine carbon fiber as produced through reaction, or the fine carbon fiber which has undergone heat treatment at 800 to 1,500° C. in an inert gas atmosphere, may be mixed with a boron compound and then subjected to heat treatment at 2,000 to 3,500° C. in an inert gas atmosphere. Alternatively, the fine carbon fiber may be subjected to heat treatment at 2,000 to 3,500° C. in the presence of an inert gas, gaseous boron, and a boron compound. The amount of a boron compound to be added varies in accordance with the type of boron compound. For example, when boron carbide is employed, the amount of boron carbide is 0.05 to 10 mass %, preferably 0.1 to 5 mass %, on the basis of the entire fine carbon fiber. Through heat treatment in the presence of the boron compound, the fine carbon fiber exhibits improved electrical conductivity, along with improved carbon crystallinity (interlayer distance $d_{002}$).

Boron or a boron compound having the below-described properties is preferably employed for heat treatment. Since heat treatment is carried out at 2,000° C. or higher, a boron compound which is not evaporated through, for example, decomposition at a temperature below 2,000° C. is employed. Examples of such a boron compound include elemental boron; boron oxides such as $B_2O_2$, $B_2O_3$, $B_4O_3$, and $B_4O_5$; boron oxo acids such as orthoboric acid, metaboric acid, and tetraboric acid and salts thereof; boron carbides such as $B_4C$ and $B_6C$; and BN. Boron carbides such as $B_4C$ and $B_6C$ and elemental boron are preferred.

Any heat treatment furnace may be employed, so long as the furnace can maintain a predetermined temperature of at least 2,000° C., preferably at least 2,300° C. A typically employed furnace, such as an Acheson furnace, a resistance furnace, or a high-frequency furnace, may be employed. In some cases, carbon powder or carbon fiber may be heated through direct application of electricity.

Heat treatment is carried out in a non-oxidative atmosphere, preferably in an atmosphere of one or more of rare gasses such as argon, helium, and neon. From the viewpoint of productivity, heat treatment is preferably carried out within a short period of time. When carbon fiber is heated over a long period of time, the carbon fiber is sintered to form an aggregate, resulting in low production yield. Therefore, after the center of the carbon fiber is heated to a target temperature, the carbon fiber is not necessarily kept at the temperature for more than one hour.

When carbon fiber is subjected to heat treatment, a portion of the carbon fiber is sintered to thereby form a block, as in the case of a typical carbon fiber product. Since the resultant carbon fiber block cannot be added to electrodes, etc. or employed as an electron emission material, the block must be subjected to crushing, to thereby obtain the fine carbon fiber suitable for use as a filler material.

Therefore, the resultant block is subjected to crushing, pulverization, and classification, to thereby obtain fine carbon fiber suitable for use as a filler material. Simultaneously, separation of a non-fibrous product is carried out. When the block is excessively pulverized, the performance of the resultant carbon fiber as a filler is impaired. In contrast, when the block is insufficiently pulverized, the resultant carbon fiber fails to be mixed with an electrode material satisfactorily, and thus the effect of the carbon fiber is not obtained.

In order to obtain fine carbon fiber suitable for use as a filler, firstly, the carbon fiber block formed through heat treatment is crushed into pieces having a size of 2 mm or less, and then pulverized by use of a pulverization apparatus. Examples of the crushing apparatus which may be employed include a typical ice crusher and a rotoplex. Examples of the pulverization apparatus which may be employed include impact-type pulverization apparatuses such as a pulverizer and a ball mill; autogeneous grinding apparatuses; and pulverization apparatuses such as a micro jet. Separation of a non-fibrous product may be carried out through, for example, air classification. Pulverization/classification conditions vary in accordance with the type of a pulverization apparatus to be employed and operation conditions, but preferably pulverization/classification conditions are determined so as to obtain a carbon fiber suitable as a filler; i.e., a carbon fiber having a length of 5,000 to 400,000 nm. The aspect ratio of the carbon fiber is preferably at least 10, more preferably at least 50.

The fine carbon fiber of the present invention may be incorporated into a battery electrode, to thereby improve performance of the resultant battery. Examples of the battery include batteries which require improved electrical conductivity of electrodes and which require performance of intercalation, such as a lithium battery, a lead storage battery, a polymer battery, and a dry battery.

By virtue of its high electrical conductivity, when the fine carbon fiber of the present invention is employed in such a battery, the electrical conductivity of the resultant battery can be enhanced. When the fine carbon fiber is employed in a lithium battery, the charge/discharge capacity of the battery can be increased, since the fine carbon fiber exhibits high intercalation performance as a carbon material for a negative electrode.

The amount of fine carbon fiber incorporated into an electrode (comprised of fine carbon fiber in accordance with the present invention and fine carbon fiber that is not in accordance with the present invention) is preferably 0.1 mass % to 20 mass % inclusive. When the incorporation amount exceeds 20 mass %, the packing density of carbon in the electrode is lowered, thereby lowering the charge/discharge capacity of the resultant battery. In contrast, when the incorporation amount is less than 0.1 mass %, the effect of the fine carbon fiber is lowered. The fine carbon fiber of the present invention is incorporated into the electrode in an amount of 2 to 100 vol. %, preferably 5 to 80 vol. %, more preferably 15 to 50 vol. %, on the basis of the total volume of fine carbon fiber incorporated into the electrode.

When an electrode; for example, a negative electrode of a lithium battery, is formed from the fine carbon fiber of the present invention, the fine carbon fiber and a binder are added to a carbonaceous material such as graphite powder or mesophase carbon micro beads (MCMB), and the resultant mixture is sufficiently kneaded such that the carbon fiber is dispersed in the mixture as uniformly as possible.

EXAMPLES

The present invention will next be described in more detail by way of Examples, which should not be construed as limiting the invention thereto.

Example 1

$Fe_3O_4$ fine particles (average particle size: 5 nm) which had been prepared in a reversed micelle containing water/bis(2-ethylhexyl) sulfosuccinate sodium salt (AOT)/benzene were dispersed in benzene such that the amount of $Fe_3O_4$ fine particles became 0.1 mass % as reduced to Fe. Sulfur (0.5 mass %) was dissolved in the resultant mixture, to thereby prepare a raw material.

Fine carbon fiber was produced from the thus-prepared raw material through a method similar to that disclosed in Japanese Patent No. 2778434. The resultant fine carbon fiber was subjected to heat treatment at 1,200° C. for 30 minutes in an argon atmosphere.

The heat-treated fine carbon fiber was observed under a transmission electron microscope. As a result, each fiber of the carbon fiber was found to have a diameter of 20 to 100 nm and an aspect ratio of 50 to 1,000.

Figure 3:
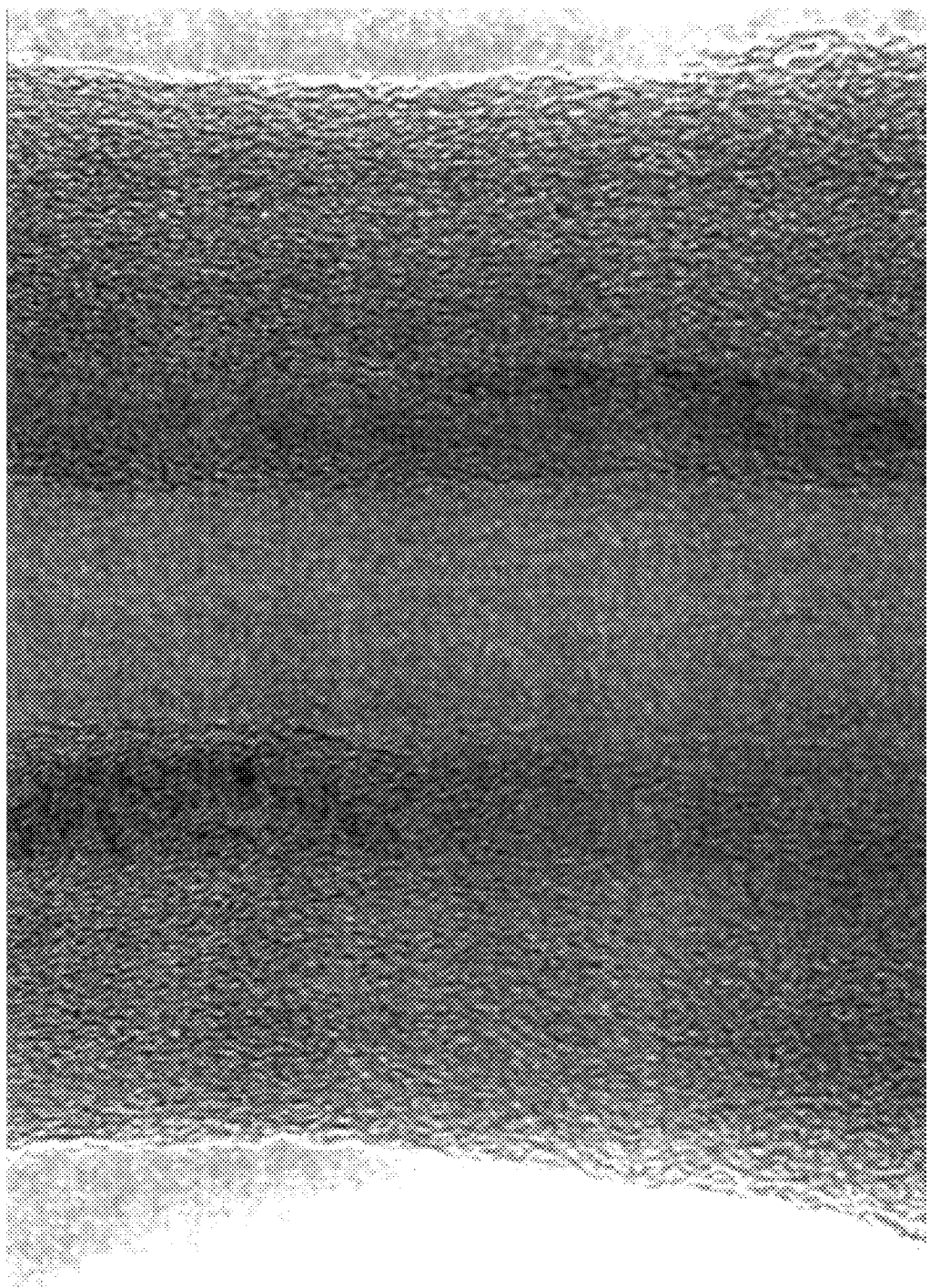
FIG. 3 shows a transmission electron micrograph of the fine carbon fiber of the present invention (magnification: $2\times10^6$) (the center portion contains a herringbone-shaped carbon structure).

FIG. 3 shows a transmission electron micrograph of a fiber of the resultant fine carbon fiber. As shown in FIG. 3, the fiber contains a hollow space, and has a two-layer structure formed of a center portion containing a herringbone-shaped carbon structure and a peripheral portion having a carbon structure different from that of the center portion (d0=15 nm, d1=35 nm, and d=70 nm).

Example 2

The procedure of Example 1 was repeated, except that the dispersion amount of $Fe_3O_4$ fine particles (average particle size: 5 nm) was 0.2 mass % as reduced to Fe, to thereby produce a fine carbon fiber. The resultant fine carbon fiber was subjected to heat treatment. The heat-treated fine carbon fiber was observed under a transmission electron microscope.

Each fiber of the resultant fine carbon fiber was found to have a diameter of 20 to 100 nm and an aspect ratio of 50 to 1,000. Of 50 of the fine carbon fibers, 38 fibers were found to contain a center portion and a peripheral portion, the center portion having a carbon structure different from that of the peripheral portion. Some fibers were found to have a non-continuous hollow space; i.e., a partially closed hollow space.

FIG. 4 shows a transmission electron micrograph of a fine carbon fiber having a partially closed hollow space. As shown in FIG. 4, the hollow space of the carbon fiber is closed at three points.

Comparative Example 1

Figure 5:
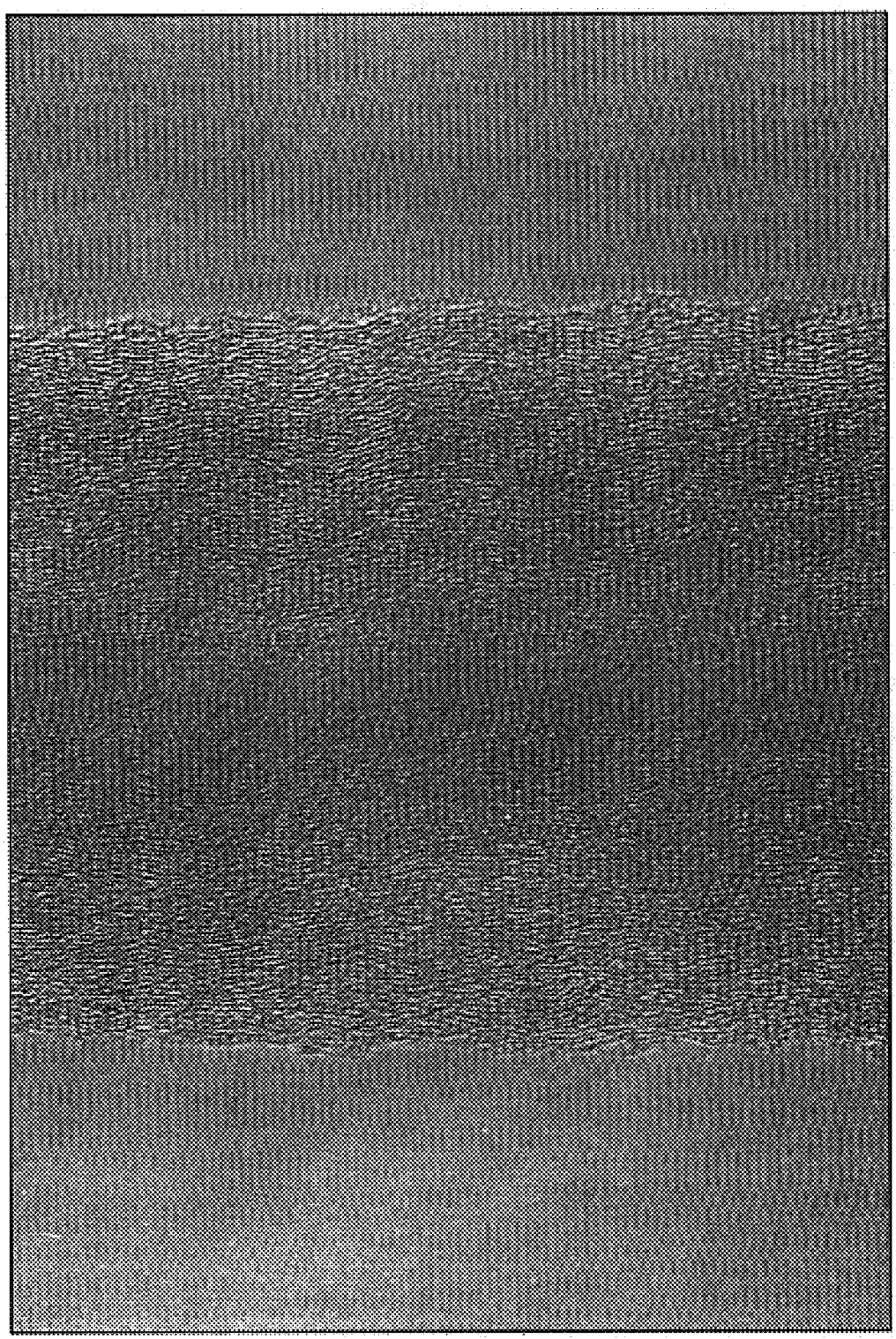
FIG. 5 shows a transmission electron micrograph of a conventional fine carbon fiber (magnification: $2\times10^6$).

Ferrocene (($C_5H_5)_2Fe$) (4 mass %) and sulfur (0.1 mass %) were dissolved in benzene, to thereby prepare a raw material. Conventional carbon fiber was produced from the raw material through the same method as that disclosed in Japanese Patent No. 2778434. The resultant carbon fiber was subjected to heat treatment at 1,200° C. for 30 minutes in an argon atmosphere. FIG. 5 shows a transmission electron micrograph of the resultant carbon fiber.

Example 3

The amount of hydrogen occluded in the fine carbon fiber produced in Example 1 was measured through volumetry. For comparison, the carbon fiber produced in Comparative Example 1 was also employed.

The amounts of hydrogen occluded in the carbon fibers of Example 1 and Comparative Example 1 were found to be 0.8 mass % and 0.1 mass %, respectively.

EFFECTS OF THE INVENTION

According to the present invention, there can be provided a fine carbon fiber differing from a conventional carbon fiber and a vapor grown carbon fiber; i.e., there can be provided vapor grown fine carbon fiber, containing a hollow space in its interior, and having a multi-layer structure, an outer diameter of 2 to 500 nm, and an aspect ratio of 10 to 15,000, wherein the fiber contains a center portion and a peripheral portion, the center portion having a carbon structure different from that of the peripheral portion. In addition, there can be provided a fine carbon fiber which exhibits improved occlusion of a gas such as hydrogen, and which is used as a filler which, when incorporated into a battery electrode, can improve electrical conductivity, thermal conductivity, and strength.

While the invention has been described in detail and with reference to specific embodiments thereof, it will be apparent to one skilled in the art that various changes and modifications can be made therein without departing from the spirit and scope thereof.

What is claimed is:

1. A vapor grown fine carbon fiber comprising a hollow space along the fiber in its interior, and having a multi-layer structure, an outer diameter of 2 to 500 nm, and an aspect ratio of 10 to 15,000, wherein the fiber comprises a center portion and a peripheral portion, and wherein the center portion has a carbon structure comprised of carbon sheets aligned differently from carbon sheets that form the structure of the peripheral portion.

2. A vapor grown fine carbon fiber comprising a hollow space along the fiber in its interior, and having a multi-layer structure, an outer diameter of 2 to 500 nm, and an aspect ratio of 10 to 15,000, wherein the fiber comprises a center portion and a peripheral portion, and wherein the center portion has a carbon structure different from that of the peripheral portion, and wherein the hollow space of the fiber has a diameter (d0) and the fiber has an outer diameter (d) satisfying the following relation: $0.1d \leq d0 \leq 0.8d$.

3. A vapor grown fine carbon fiber comprising a hollow space along the fiber in its interior, and having a multi-layer structure, an outer diameter of 2 to 500 nm, and an aspect ratio of 10 to 15,000, wherein the fiber comprises a center portion and a peripheral portion, and wherein the center portion has a carbon structure different from that of the peripheral portion and wherein the center portion of the fiber has a diameter (d1), the hollow space of the fiber has a diameter (d0) and the fiber has an outer diameter (d) satisfying the following relations: $1.1d0 \leq d1$ and $d1 \leq 0.9d$.

4. A vapor grown fine carbon fiber comprising a hollow space along the fiber in its interior, and having a multi-layer structure, an outer diameter of 2 to 500 nm, and an aspect ratio of 10 to 15,000, wherein the fiber comprises a center portion and a peripheral portion, and wherein the center portion has a carbon structure different from that of the peripheral portion and wherein the center portion of the fiber contains a herringbone-shaped carbon structure, and the peripheral portion of the fiber contains a concentric ring carbon structure.

5. The fine carbon fiber according to claim 1, wherein the hollow space is partially closed.

6. The fine carbon fiber obtained through heat treatment of a fine carbon fiber as recited in claim 1 at about 2,000 to about 3,500 C.

7. The fine carbon fiber according to claim 1, further comprising boron or a boron compound.

8. The fine carbon fiber according to claim 7, wherein boron (B) is contained, in an amount of about 0.01 to about 5 mass %, in carbon crystals constituting the carbon fiber.

9. A fine carbon fiber mixture comprising a fine carbon fiber as recited in claim 1 in an amount of about 5 to about 80 vol. % on the basis of the entire carbon fiber mixture.

10. A fine carbon fiber composition comprising a fine carbon fiber according to claim 1.

11. A gas occlusion material comprising a fine carbon fiber composition according to claim 10.

12. A secondary battery comprising an electrode material, wherein the electrode material is a fine carbon fiber composition according to claim 10.

13. The fine carbon fiber according to claim 1, wherein the center portion of the fiber contains a carbon structure in which carbon sheets are aligned substantially perpendicular to the axis of the fiber.

14. A vapor grown fine carbon fiber comprising a hollow space along the fiber in its interior, and having a multi-layer structure, an outer diameter of 2 to 500 nm, and an aspect ratio of 10 to 15,000, wherein the fiber comprises a center portion and a peripheral portion, wherein the center portion has a carbon structure different from that of the peripheral portion, and wherein the hollow space is partially closed at at least one point which is between the ends of the carbon fiber.

* * * * *